April 22, 1969   A. SAWATZKY   3,440,140

PROTECTION OF ZIRCONIUM ALLOY COMPONENTS AGAINST HYDRIDING

Filed Nov. 16, 1966

INVENTOR
Anton Sawatzky
BY Weir, Marshall,
MacRae & Lamb
PATENT AGENT

United States Patent Office 3,440,140
Patented Apr. 22, 1969

3,440,140
PROTECTION OF ZIRCONIUM ALLOY COMPONENTS AGAINST HYDRIDING
Anton Sawatzky, Pinawa, Manitoba, Canada, assignor to Atomic Energy of Canada Limited, Ottawa, Ontario, Canada, a corporation of Canada
Filed Nov. 16, 1966, Ser. No. 594,742
Claims priority, application Canada, Dec. 3, 1965, 946,919
Int. Cl. G21c *13/08, 3/06;* F28f *21/08*
U.S. Cl. 176—43  9 Claims

ABSTRACT OF THE DISCLOSURE

Zirconium and zirconium alloy components are susceptible to structural weakening caused by the absorption of hydrogen. A method of protecting such components is disclosed which includes the use of sacrificial members of zirconium bonded to the component to be protected. These sacrificial members are maintained at a lower temperature than the component so that any hydrogen absorbed by the component will diffuse to the sacrificial member thereby preserving the structural integrity of the component.

---

Figure 1:
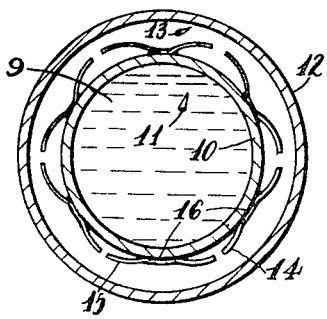

This invention relates to a method and apparatus for reducing the hydriding of certain zirconium alloy components. In particular, it relates to a method for reducing the hydriding of zirconium alloy tubing when used in hydrogen bearing environments and to a particular tubing structure useful therein.

Zirconium and its alloys are desirable materials for use in nuclear reactors due to their low value of neutron capture cross-section. This desirable property leads to efficient and economical power reactor systems. Such materials normally have adequate strength and ductility for use at temperatures in the vicinity of 500° C. Zirconium, however, has an affinity for hydrogen and is capable of absorbing a sufficient amount of hydrogen to form hydrides. The consequent precipitation of zirconium hydride in a zirconium alloy component has a deleterious effect on the mechanical properties of the component and may, in time, lead to serious embrittlement if the absorption of hydrogen is not controlled. Clearly, this limitation in the useful life of the component is undesirable.

Nuclear reactors using organic coolants are presently contemplated. When zirconium alloy components are exposed to organic coolants it is found that excessive amounts of hydrogen may be absorbed. This is due to the fact that the organic coolant constitutes a medium which has no oxidizing potential and, in addition, contains hydrogen produced by thermal decomposition.

It is therefore, a feature of this invention to provide a method for reducing the hydriding of certain zirconium alloy components.

It is a further feature of this invention to provide a zirconium alloy structure having a preselected portion resistant to hydriding.

The method of this invention comprises the use of an additional member of zirconium alloy, which may be termed a sacrificial member, in conjunction with the zirconium alloy component which is to be protected. A first portion of the sacrificial member is securely bonded to the zirconium alloy component, the bond being of sufficient intimacy to permit the diffusion of hydrogen across the junction. A second portion of the sacrificial member which, preferably, is spaced from the component, is maintained at a temperature lower than that of the component to be protected. The thermal diffusion of hydrogen in zirconium alloys is such that hydrogen flows from a hot region to a cooler region and hence, any hydrogen absorbed by the zirconium alloy component will tend to be transferred to the sacrificial member. Eventually, as the quantity of hydrogen absorbed builds up, zirconium hydride will be precipitated in the sacrificial member while no precipitation, with consequent diminution of structural strength, takes place in the zirconium alloy member.

The apparatus of this invention comprises thin sleeves or fins of zirconium alloy attached to the component in such a manner as not to interfere with its function and maintained at a temperature lower than that of the component so that the diffusion process described above will transfer hydrogen from the component to the sleeves or fins functioning as sacrificial members. The fins are, preferably, shaped to avoid sharp or protruding ends which would be vulnerable to breaking. Chipped or broken fin pieces would cause severe damage to pumps and valves in a reactor cooling system.

Figure 2:
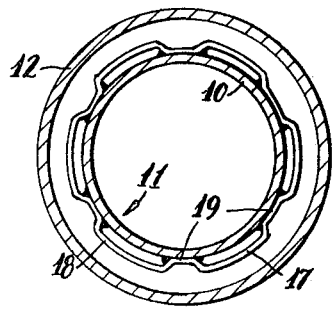
Figure 4:
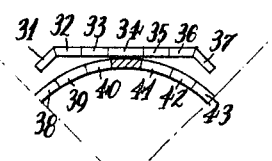
Figure 5:
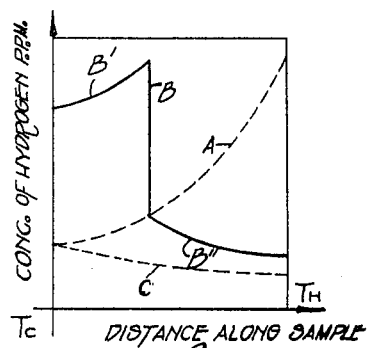
Figure 3:
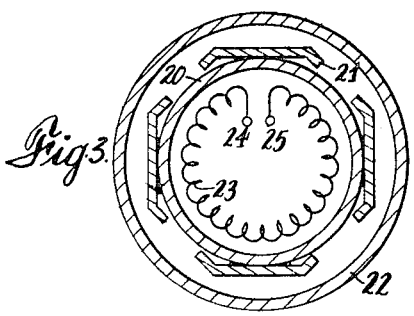
Figure 6:
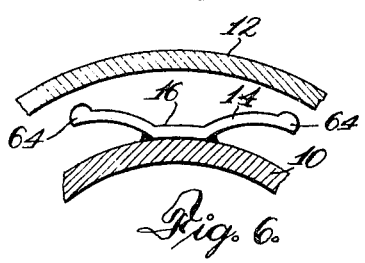

Further features of this invention will become apparent from the following description of one embodiment of this invention taken in conjunction with the accompanying drawings, in which:

FIGURE 1 is a cross-sectional view of a zirconium alloy tube having hydrogen absorbing fins surrounded by a reactor calandria tube, FIGURE 2 is a cross-sectional view similar to that of FIGURE 1, but showing a different fin structure, FIGURE 3 is a cross-sectional view of apparatus useful in demonstrating the method of this invention, FIGURE 4 is related to an example demonstrating the method of this invention, FIGURE 5 is a graph showing the typical distribution of hydrogen is a sample of Zircaloy–2 under a temperature gradient, and FIGURE 6 is a modified fin structure for use with the zirconium alloy tube shown in FIGURE 1.

This invention has particular utility in the protection of zirconium alloy tubing when used in a nuclear reactor having an organic coolant and an embodiment of this invention relating to such an environment will be described. The invention is not, however, limited to use in reactors having organic coolant. It is also applicable to aqueously cooled reactors where hydriding is a problem. Referring to FIGURE 1, there is shown a cross-sectional view of a zirconium alloy pressure tube 10 positioned inside a reactor calandria tube 12, which may, typically, be manufactured from aluminum. In operation, the reactor has removable fuel elements (not shown) contained in the interior 11 of pressure tube 10. Organic coolant, indicated at 9 in FIGURE 1, typically at temperatures around 350° C. and pressures around 200 p.s.i.g., also flows in the interior 11 of pressure tube 10 to extract the heat generated in the fuel elements. The space 13, between pressure tube 10 and calandria tube 12, contains carbon dioxide to act as an insulant and the volume outside calandria tube 12 is occupied by heavy water moderator typically at a temperature of 80° C.

Thus, it can be seen that the interior surface of zirconium alloy tube 10 is exposed to a hydrogen bearing medium, the organic coolant, at a high temperature and thus is liable to be structurally weakened by the absorption of hydrogen and the precipitation of zirconium hydride. Since the projected life of pressure tubes in a reactor is of the order of 20 years even a slow rate of hydrogen absorption can present a serious problem.

According to this invention, the pressure tube 10 is provided with zirconium alloy fins or sacrificial members, two of which are indicated at 14 and 15. These fins are attached to the pressure tube 10 by seam welding or other suitable means which gives intimate contact between the fins and the pressure tube. Due to the temperature gradient which exists between the interior of the pressure tube and the exterior of the calandria tube during operation of the reactor it will be clear that fins 14 and 15 are at lower temperature than pressure tube 10. It will be clear that the fin structure may be formed in a unitary manner with the tube by an extrusion process.

The phenomenon of hydrogen diffusion in zirconium alloys under the influence of a temperature gradient has been discussed by the inventor in the article "Hydrogen in Zircaloy-2: Its Distribution and Heat of Transport," Journal of Nuclear Materials, 2, No. 4 (1960), pp. 321–8, to which reference may be made. Briefly, it is shown that if hydrogen flows down a temperature gradient in Zircaloy, the resulting distribution of hydrogen in the Zircaloy may be that shown by curve B in FIGURE 5. Referring to FIGURE 5, curve A shows the terminal solid solubility of hydrogen in Zircaloy as a function of temperature. Thus, it can be seen that the hydrogen concentration at the colder end ($T_C$) of the Zircaloy sample exceeds the terminal solid solubility and must be precipitated as zirconium hydroxide. The concentration of hydrogen at the warm end ($T_H$) of the Zircaloy sample is less than the terminal solid solubility and thus, there will be no precipitation of zirconium hydride in this portion. Relating curve B of FIGURE 5 to the pressure tube 10 and fins 14 and 15 of FIGURE 1, it is necessary that the temperature gradient be such that the portion B' of the curve represents the conditions in the fins and the portion B" represents the conditions in the pressure tube.

For particular values of hydrogen current density and temperature gradient in a Zircaloy sample the two phase region, curve B' in FIGURE 5 may be eliminated. Instead a layer of solid hydride is formed at the colder surface and the hydrogen distribution is as given by curve C in FIGURE 5. Relating this situation to the pressure tube 10 and fins 14 and 15 of FIGURE 1 the hydride is formed at the colder fin surface bearing the major portion of the fin hydride free. As more hydrogen is fed from the pressure tube into the fin the hydride layer advances toward the base of the fin. This is the more desirable situation rather than the fin being operated in the two phase region.

In designing the exact configuration of the fins or sacrificial members, it will be clear that many variable factors, which are within the province of one skilled in the art, must be considered. The volume of zirconium alloy constituting the fins must be sufficient to absorb almost the total amount of hydrogen flowing into the pressure tube during its expected life. In establishing the required volume of zirconium alloy in the fin, it is to be noted that the ratio of hydrogen to zirconium in zirconium hydride is of the order of 18,000 p.p.m. by weight.

It is desirable to have the major portion of the fin mass concentrated at the cooled portion of the fin so that the maximum amount of hydrogen may be absorbed from the pressure tube. Such a modified fin is shown in FIGURE 6 in relation to the pressure tube 10 and calandria tube 12. The fin 14 has been modified by additional mass at the ends denoted 64.

The spacing of the end portion of the fins from the pressure tube is determined by the balance of two conflicting factors. The spacing must be such that the end portions of the fins are a sufficient distance from the pressure tube to establish a significant temperature gradient sufficient to cause the diffusion of hydrogen from the pressure tube to the fin. Calculations relating to the type of fin structure shown in FIGURES 1 and 2 have shown that a temperature gradient greater than 10° C./cm. is sufficient for this purpose. For different configurations of fin structure the magnitude of the necessary temperature gradient will vary and may, in some cases, be less than 10° C./cm. The spacing must not be so great that there is unnecessary heat loss to the calandria tube 12 and, obviously, the fin configuration must be such as to fit into the available space. The configuration of the sacrificial members must also be such that there is no weakening of any load-bearing portion of the pressure tube and no possibility of any resulting leak formation.

As an example only, a possible configuration of zirconium alloy tubing with sacrificial members designed in accordance with this invention may be that shown in FIGURE 2. In this configuration, sleeves such as 17 and 18 of zirconium alloy are provided to form sacrificial members and are seam welded to pressure tube 10 at points 19. The pressure tube 10 has an inner diameter of 3 inches and a thickness of 0.078 inch. The annular spacing between pressure tube 10 and calandria tube 12 is 0.24 inch. Assuming operating conditions of a pressure tube temperature of 400° C. and a calandria tube temperature of 70° C. then a maximum spacing for sleeves 17 and 18 of 1/16 inch from the outer wall of the pressure tube 10 will provide a temperature gradient in excess of the preferred figure of 10° C./cm. A greater spacing, such as 1/8 inch, will provide even larger temperature gradients.

The following example is illustrative of the method of this invention in reducing the hydriding of zirconium alloy components.

EXAMPLE

A test section of Zircaloy-2 tubing approximately 2 feet in length was constructed. Referring to FIGURE 3, there is shown a cross-sectional view of the Zircaloy-2 tube 20. Attached to tube 20 by seam welds were four Zircaloy-2 fin sections 21 also 2 feet in length. The tube and fins were prehydrided to 520 p.p.m. hydrogen, which is about 250 p.p.m. in excess of the terminal solid solubility at 400° C. The purpose of prehydriding the test section is to reproduce the conditions which would occur after several months operation in a hydrogen environment.

The test section was placed inside an aluminum jacket 22 which was water cooled to maintain it at a temperature of approximately 70° C. An electrical heating coil 23 was placed inside the test section and connected via terminals 24 and 25 to a source of electrical power (not shown) which was adjusted to maintain the temperature of the tube section 20 at 400° C. A flow of water-saturated carbon dioxide was arranged past both inside and outside surfaces of tube section 20 to simulate the hydriding rate which could be expected in a nuclear reactor.

Sections of the tube and fin were removed after 43 days' testing and after 105 days' testing. These sections were divided into small segments, as illustrated schematically in FIGURE 4 and each segment was subject to a separate metalographic examination to determine its hydrogen content. The results of the analyses are shown in Table I below, the location of each segment being identified in FIGURE 4.

TABLE I

| Segment | Hydrogen content (p.p.m.) | |
|---|---|---|
| | After 43 days | After 105 days |
| 31 | 1,420 | 2,140 |
| 32 | 1,220 | 1,660 |
| 33 | 750 | 773 |
| 34 | 488 | 250 |
| 35 | 745 | 756 |
| 36 | 1,080 | 1,615 |
| 37 | 1,260 | 2,095 |
| 38 | 220 | 195 |
| 39 | 225 | 179 |
| 40 | 320 | 179 |
| 41 | | 175 |
| 42 | | 164 |
| 43 | | 167 |

It will be clear from an examination of Table I that during the course of the test a considerable quantity of hydrogen diffused from the tube 20 to the fin 21 and particularly to the end segments 31 and 37 of the fin which were maintained at a lower temperature than the tube and the remainder of the fin.

The sacrificial members can be formed from a zirconium alloy different from that of the component in order to obtain a different hydriding rate in the sacrificial member. For example, in organic cooled reactor components, as previously described in regard to FIGURE 1, the tube 10 could be formed from Zr–2.5% Nb and the fins 14 and 15 from Zircaloyl–2. Zircaloy–2 has a somewhat lower hydriding rate in air than does Zr–2.5% Nb whereas the former has a much higher hydriding rate in organic coolant than the latter. Thus, in the situation shown in FIGURE 1, the arrangement of tube and fin materials as described above would result in a lower overall hydriding rate than if both fin and tube were of Zr–2.5% Nb.

Thus, there has been described, a method for reducing the hydriding of zirconium alloy components, exposed to a hydrogen bearing environment, by the use of sacrificial members also formed from zirconium alloy. It will be clear that the sacrificial members could be formed integrally with the component, in which case the method of this invention comprises maintaining a portion of the component at a higher temperature than the remainder of the component so that hydrogen will diffuse away from the portion maintained at the higher temperature.

There has also been disclosed a zirconium alloy structure incorporating sacrificial members. It will be clear that many variations in the configuration of the structure may be made within the scope of this invention. It is necessary that the sacrificial member be intimately bonded to the component which is to be protected and the configuration so arranged with respect to the environment that a portion of the sacrificial member is at a lower temperature than the component to be protected. In the case of a finned tube, it is desirable that the bonding or junction area should be at least twice the cross-sectional area of the fin. As much as possible of the sacrificial member is maintained at the lower temperature in order to absorb the maximum amount of hydrogen. While the disclosed structures may bear a superficial resemblance to conventional heat exchangers, they are, of course, completely different in design and purpose. The structures of this invention are designed to minimize heat loss as much as possible consistent with producing the required temperature gradient in the fins. In heat exchangers the design is directed to achieving the maximum amount of heat conduction.

I claim:

1. A method for reducing hydriding of a zirconium alloy component in a hydrogen bearing environment comprising the steps of: bonding a sacrificial member of zirconium alloy to said component, a portion of said sacrificial member being spaced from said component, maintaining said portion at a temperature significantly below that of said component so that hydrogen absorbed by said component diffuses to and is retained by said portion of said sacrificial member, and maintaining said component and said sacrificial member exposed to the hydrogen bearing environment.

2. The method as defined in claim 1, wherein the temperature gradient between said component and said sacrificial member is maintained greater than 10° C./cm.

3. A method for reducing the hydriding of a preselected portion of a zirconium alloy component comprising the steps of: providing a projection of zirconium alloy integrally formed with said component and constituting a sacrificial member, establishing a temperature gradient in said component so that said preselected portion is at a significantly higher temperature than the zirconium alloy projection, maintaining said component exposed to a zirconium hydriding environment, and permitting the diffusion of hydrogen from said preselected portion to the zirconium alloy projection to be retained therein.

4. The method as defined in claim 3, wherein said temperature gradient is at least 10° C./cm. across the component and the projection thereon.

5. A method as set forth in claim 1 wherein said zirconium alloy component is a pressure tube exposed to a hydrogen bearing environment and spaced from and enclosed by a nuclear reactor calandria tube normally at a lower temperature than the pressure tube and said sacrificial member is a zirconium alloy fin, further comprising the step of positioning said fin in the space between said calandria tube and said pressure tube to maintain a temperature gradient in said fin of at least 10° C./cm.

6. In combination in a nuclear reactor, a first zirconium alloy component normally maintained at a first temperature and exposed to a zirconium hydriding environment, a second component normally maintained at a second temperature, positioned adjacent to and spaced from said first component, said second temperature being less than said first temperature, and at least one sacrificial member of zirconium alloy intimately bonded by a hydrogen pervious bond or unitary with said first component, said sacrificial member having a portion spaced from said first component and extending towards and spaced from said second component, the resulting temperature gradient in said portion of each sacrificial member being at least 10° C./cm. whereby said portion of said sacrificial member selectively absorbs hydrogen in response to said temperature gradient.

7. The combination of claim 6 wherein said first component is formed from Zr–2.5% Nb and said sacrificial members are formed from Zircaloy–2, an alloy composed of essentially zirconium with 1.47% tin, .14% iron, .09% chromium and .05% nickel.

8. In a nuclear reactor having a calandria tube enclosing a pressure tube formed from zirconium alloy, the interior of said pressure tube being exposed to a hydrogen bearing environment and said calandria tube being maintained at a temperature lower than that of said pressure tube, the improvement comprising, a sacrificial member of zirconium alloy having a first and a second portion, means intimately bonding the first portion to said pressure tube with a hydrogen pervious bond, said second portion occupying the annular space between said pressure tube and said calandria tube and spaced from both said pressure tube and said calandria tube to selectively absorb hydrogen from said pressure tube in response to the decreasing temperature gradient from said pressure tube to said calandria tube.

9. In combination, a zirconium alloy pressure tube normally maintained at a first temperature and exposed to a hydrogen bearing environment, a nuclear calandria tube normally maintained at a second temperature positioned adjacent to and enclosing said pressure tube and spaced therefrom, said second temperature being less than said first temperature, at least one sacrificial member of zirconium alloy, means bonding a first portion of said sacrificial member to said pressure tube by a hydrogen pervious bond, said sacrificial member having a fin of arcuate shape substantially parallel to and spaced from the outer circumference of said pressure tube and the inner circumference of said calandria tube, the resulting temperature gradient in the fin being at least 10° C./cm. whereby the fin selectively absorbs hydrogen in response to said temperature gradient.

References Cited

UNITED STATES PATENTS

| 3,087,882 | 4/1963 | Martin | 176—81 X |
| 3,106,520 | 10/1963 | Wolfe et al. | 176—87 X |
| 3,132,998 | 5/1964 | Long et al. | 176—43 X |
| 3,216,902 | 11/1965 | Costes et al. | 176—87 X |
| 3,278,388 | 10/1966 | Thome | 176—87 X |

FOREIGN PATENTS

| 1,263,814 | 5/1961 | France. |
| 1,125,561 | 5/1962 | Germany. |

REUBEN EPSTEIN, *Primary Examiner.*

U.S. Cl. X.R.

165—134; 176—87; 204—196